(12) United States Patent
Yu et al.

(10) Patent No.: US 12,304,503 B2
(45) Date of Patent: May 20, 2025

(54) VEHICLE ORIENTATION ESTIMATION SYSTEM AND VEHICLE ORIENTATION ESTIMATION METHOD

(71) Applicant: Hitachi Astemo, Ltd., Hitachinaka (JP)

(72) Inventors: Zihan Yu, Hitachinaka (JP); Takakiyo Yasukawa, Hitachinaka (JP); Kota Irie, Hitachinaka (JP); Tatsuhiko Monji, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 175 days.

(21) Appl. No.: 18/025,839

(22) PCT Filed: Jun. 29, 2021

(86) PCT No.: PCT/JP2021/024521
§ 371 (c)(1),
(2) Date: Mar. 10, 2023

(87) PCT Pub. No.: WO2022/059289
PCT Pub. Date: Mar. 24, 2022

(65) Prior Publication Data
US 2023/0347910 A1 Nov. 2, 2023

(30) Foreign Application Priority Data
Sep. 16, 2020 (JP) .................. 2020-155190

(51) Int. Cl.
*B60W 40/11* (2012.01)
*B60W 40/072* (2012.01)
(Continued)

(52) U.S. Cl.
CPC ........ *B60W 40/112* (2013.01); *B60W 40/072* (2013.01); *G06V 20/588* (2022.01); *B60W 2420/403* (2013.01)

(58) Field of Classification Search
CPC ............. B60W 40/112; B60W 40/072; B60W 2420/403; G06V 20/588; B62J 45/4151; B62J 45/4152; G01C 9/00
See application file for complete search history.

(56) References Cited

U.S. PATENT DOCUMENTS 6,813,370 B1 * 11/2004 Arai ..................... G06V 10/457
340/919
2010/0177197 A1 7/2010 Kimura et al.
2019/0279386 A1 9/2019 Motohashi et al.

FOREIGN PATENT DOCUMENTS

EP 2 889 641 A1 7/2015
EP 3 375 682 A1 9/2018
(Continued)

OTHER PUBLICATIONS

English Translation of the International Search Report for International Application No. PCT/JP2021/024521 dated Sep. 14, 2021.

*Primary Examiner* — Michael V Kerrigan
(74) *Attorney, Agent, or Firm* — Foley & Lardner LLP

(57) ABSTRACT

A vehicle orientation estimation system includes a region setting unit. The region setting unit can set a first region and a second region that is on a same horizontal line as the first region, in a measurement region corresponding to a road surface acquired by a distance measurement device mounted on a vehicle. The vehicle orientation estimation system can include a distance calculation unit that calculates a distance to the road surface of each of the first region and the second region from the vehicle. The vehicle orientation estimation system can also include an inclination angle calculation unit that obtains an inclination angle of the vehicle based on the distance to the road surface of each of the first region and the second region and a positional relationship of the first region and the second region.

12 Claims, 11 Drawing Sheets

(51) Int. Cl.
    *B60W 40/112*     (2012.01)
    *G06V 20/56*     (2022.01)

(56) References Cited

FOREIGN PATENT DOCUMENTS

| EP | 3 889 946 A1 | 10/2021 |
|----|---|---|
| JP | 4950290 B2 | 6/2012 |
| JP | 2015-058915 A | 3/2015 |
| JP | 2015-143979 A | 8/2015 |
| JP | 2015-227082 A | 12/2015 |
| JP | 2018-091652 A | 6/2018 |
| JP | 2020-087176 A | 6/2020 |
| WO | WO-2017/104712 A1 | 6/2017 |

* cited by examiner

VEHICLE ORIENTATION ESTIMATION SYSTEM AND VEHICLE ORIENTATION ESTIMATION METHOD

TECHNICAL FIELD

The present invention relates to a vehicle orientation estimation system and a vehicle orientation estimation method which estimate an orientation of a vehicle, and particularly relates to a technique effectively applied to estimation of an inclination angle of a motorcycle.

BACKGROUND ART

In order to prevent traffic accidents in advance, an advanced driver assistance system (ADAS) for two-wheeled vehicles has been introduced. For example, an in-vehicle camera is used to monitor the periphery of the vehicle and to recognize a vehicle, and is used for calling attention (alert), collision avoidance, and the like.

The motorcycle has a steering mechanism different from that of an automatic four-wheeled vehicle, and particularly when a traveling direction is changed, the motorcycle turns with the vehicle body inclined to the left or right. Therefore, image data captured by the in-vehicle camera is also inclined. In a camera video processing in the related art, since an inclined video is not assumed, recognition performance is greatly affected.

In order to obtain stable recognition performance, there is a method of inputting inclination information by a commercially available inclination sensor to a camera and correcting an accurate subject inclination using the inclination information. For example, in the technique disclosed in PTL 1, image processing is performed based on an inclination of an imaging unit detected by a sensor that detects a physical inclination of the imaging unit.

PTL 2 to PTL 4 disclose a technique of detecting a vehicle body inclination angle based on image data captured by imaging means.

In PTL 2, a boundary line between the road and the sky included in a captured image sequentially output from a camera device that images the front of the motorcycle is extracted, and a relative angle with a horizontal reference line of a vehicle camera is calculated.

In addition, in the technique disclosed in PTL 3, a luminance gradient direction histogram indicating a frequency distribution of a luminance gradient direction of a plurality of pixels is generated from image data, a luminance gradient direction corresponding to an edge in a vertical direction as the gravity direction, and a luminance gradient direction corresponding to an edge in a horizontal direction as a direction orthogonal to the gravity direction are specified using the luminance gradient direction histogram, and an inclination angle is estimated using at least one of the specified luminance gradient direction corresponding to the edge of the vertical direction or the specified luminance gradient direction corresponding to the edge in the horizontal direction.

In addition, in the technique disclosed in PTL 4, an inclination angle of a vehicle is estimated based on a vertical direction-average gradient for calculating an average gradient of straight lines in the vertical direction with respect to a vertical axis of image data and a horizontal direction-average gradient for calculating an average gradient of straight lines in the horizontal direction with respect to a horizontal axis by straight line detection means for detecting a plurality of straight lines from the image data.

CITATION LIST

Patent Literature

PTL 1: Japanese Patent No. 4950290
PTL 2: JP 2015-227082 A
PTL 3: WO 2017/104712 A
PTL 4: JP 2015-58915 A

SUMMARY OF INVENTION

Technical Problem

In PTL 1 described above, since the image processing is performed based on the inclination of the imaging unit detected by a dedicated sensor that detects the inclination, it is necessary to attach the dedicated sensor to the vehicle body. Without the dedicated sensor, accurate inclination correction becomes difficult.

Furthermore, in the case of using a vehicle camera for recognition, the techniques disclosed in PTL 2 to PTL 4 described above cannot estimate the inclination angle of the vehicle unless under a predetermined limited condition.

In PTL 2 to PTL 4, it is necessary to extract a horizontal line, a traffic light and a building on the roadside, and an artifact such as a crosswalk on the road, which are used for calculating the inclination angle. However, during the curve traveling, the artifact as a target may not be shown in the captured image due to the inclination of the motorcycle. Under such an environment, the technique in PTL 2 to PTL 4 cannot be applied.

For example, at night, a light emitting object such as a road surface at a short distance or a distant street lamp can be acquired, but it is difficult to acquire an image of a contour line of a building, a horizontal line, and the like. Therefore, there may be a problem that the inclination angle cannot be obtained from the captured image.

Therefore, an object of the present invention is to provide a vehicle orientation estimation system and a vehicle orientation estimation method which can accurately estimate an inclination angle of a vehicle without being affected by a traveling place or an environment in a vehicle orientation estimation system and a vehicle orientation estimation method which estimate an orientation of the vehicle using an in-vehicle camera.

Solution to Problem

In order to solve the problem, the present invention includes a region setting unit that sets a first region and a second region that is on the same horizontal line as the first region, in a measurement region corresponding to a road surface acquired by a distance measurement device mounted on a vehicle; a distance calculation unit that calculates a distance to the road surface of each of the first region and the second region from the vehicle; and an inclination angle calculation unit that obtains an inclination angle of the vehicle based on the distance to the road surface of each of the first region and the second region and a positional relationship of the first region and the second region.

Further, the present invention includes setting a first region and a second region that is on the same horizontal line as the first region, in a measurement region corresponding to a road surface acquired by a distance measurement device mounted on a vehicle; calculating a distance to the road surface of each of the first region and the second region from the vehicle; and obtaining an inclination angle of the vehicle based on the distance to the road surface of each of the first region and the second region and a positional relationship of the first region and the second region.

Advantageous Effects of Invention

According to the present invention, it is possible to realize a vehicle orientation estimation system and a vehicle orientation estimation method which can accurately estimate an inclination angle of a vehicle without being affected by a traveling place or an environment in a vehicle orientation estimation system and a vehicle orientation estimation method which estimate an orientation of the vehicle using an in-vehicle camera.

Problems, configurations, and effects other than those described above will be apparent from the description of embodiments below.

DESCRIPTION OF EMBODIMENTS

Figure 1:
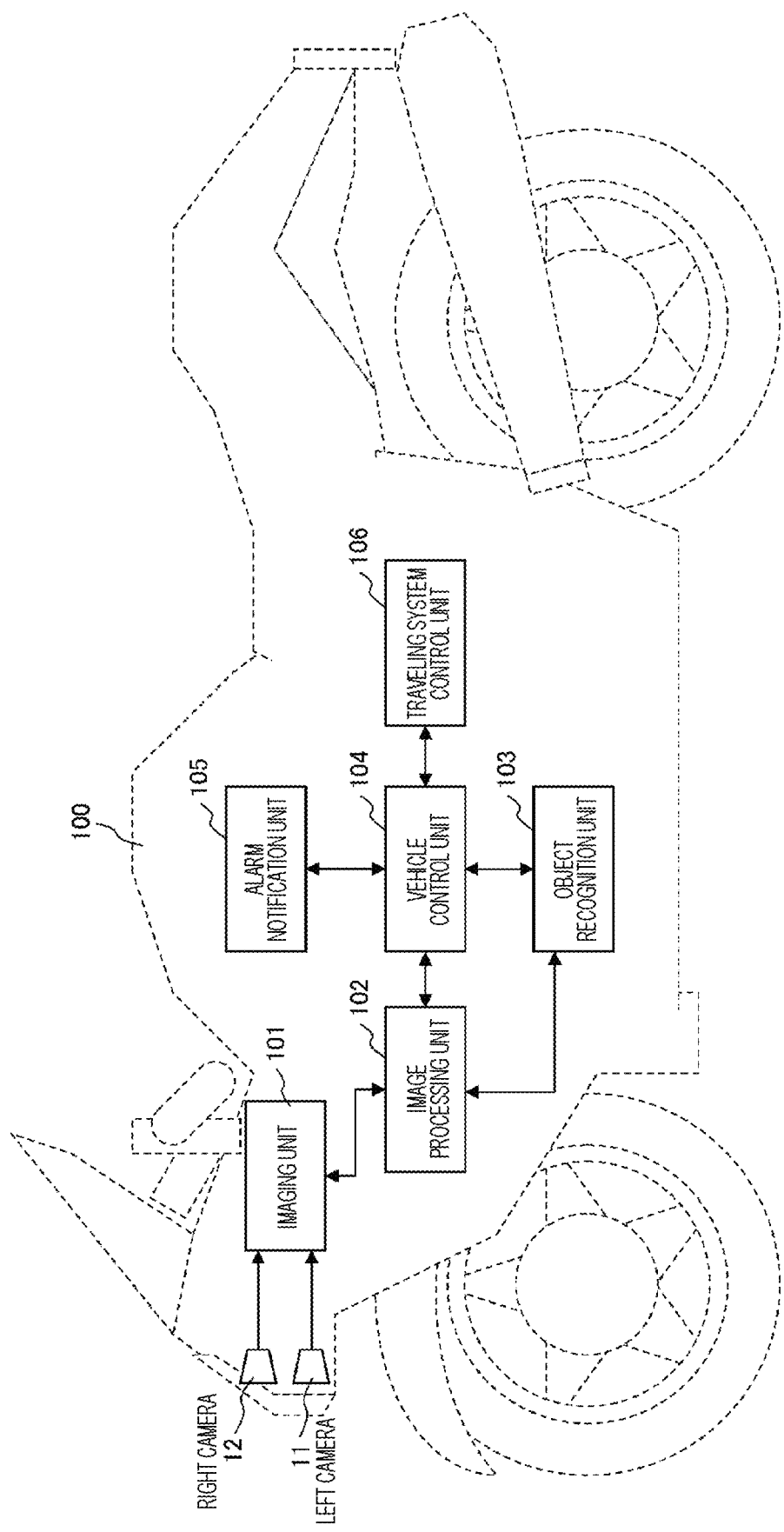
FIG. 1 is a block diagram illustrating a vehicle orientation estimation system according to Embodiment 1 of the present invention.

Hereinafter, embodiments of the present invention will be described using the drawings. In the drawings, the same components are denoted by the same reference numerals, and the detailed description of overlapping components is omitted.

Embodiment 1

First, a vehicle orientation estimation system and a vehicle orientation estimation method according to Embodiment 1 of the present invention will be described with reference to FIGS. 1 to 9. The present embodiment is an example of a case where an inclination angle (roll angle $\varphi$) of a vehicle body is estimated based on parallax data.

FIG. 1 is a block diagram illustrating a configuration of a vehicle orientation estimation system of the present embodiment. In the vehicle orientation estimation system of the present embodiment, as illustrated in FIG. 1, a vehicle 100 includes an imaging unit 101, an image processing unit 102, an object recognition unit 103, a vehicle control unit 104, an alarm notification unit 105, and a traveling system control unit 106.

The imaging unit 101 is connected to two cameras of a left camera 11 and a right camera 12, captures an image of the outside of the vehicle 100, and transfers the captured image to the image processing unit 102. Note that FIG. 1 illustrates an example in which the cameras 11 and 12 are installed in the front portion of the vehicle 100 and capture an image in front of the vehicle 100. However, the cameras may be installed in the rear portion of the vehicle 100 and capture an image behind the vehicle 100, or may be installed in both the front portion and the rear portion of the vehicle 100 and capture images in the front of and behind the vehicle 100.

The image processing unit 102 generates an image to be used in the recognition processing based on the images captured by the cameras 11 and 12 and the imaging unit 101, and transfers information regarding the image to the object recognition unit 103.

The object recognition unit 103 identifies a traveling lane, a target vehicle, a road sign, a pedestrian, and the like based on the information regarding the image information transferred from the image processing unit 102, and transfers the information regarding the object recognition to the vehicle control unit 104.

The vehicle control unit 104 acquires various types of information (a traveling speed, an operation state of a brake, and the like of the vehicle 100) from the image processing unit 102, the object recognition unit 103, the alarm notification unit 105, and the traveling system control unit 106, and compares the acquired information with information such as a maximum inclination angle and a maximum vehicle speed which are set in advance. Then, appropriate operation information (alarm notification, display, control, and the like) is provided to each unit of the image processing unit 102, the object recognition unit 103, the alarm notification unit 105, and the traveling system control unit 106.

In addition, the vehicle control unit 104 transfers warning information to the alarm notification unit 105 and transfers a steering angle, a deceleration amount, and the like relating to braking of the vehicle 100 to the traveling system control unit 106 based on the captured image and the information relating to the vehicle traveling.

The alarm notification unit 105 receives a warning relating to a traveling state of the vehicle 100 from the vehicle control unit 104, and calls the driver's attention by image display using a liquid crystal panel or the like or sound or warning sound oscillation using a speaker or the like.

The traveling system control unit 106 performs brake braking or the like based on the information of the deceleration amount relating to the traveling state of the vehicle 100 transferred from the vehicle control unit 104.

Note that the above configuration illustrates an example of the present invention, and the configuration of the present invention is not limited to the above configuration.

Figure 2:
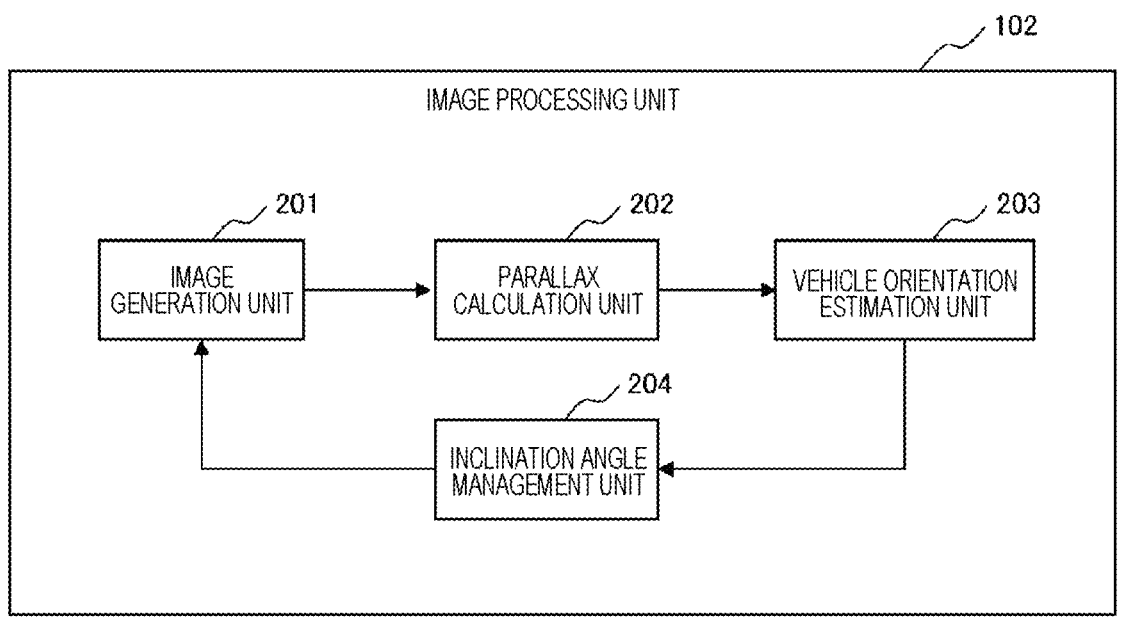
FIG. 2 is a block diagram illustrating an image processing unit of FIG. 1.

FIG. 2 is a block diagram illustrating a configuration of the image processing unit 102 of FIG. 1. The image processing unit 102 includes an image generation unit 201, a parallax calculation unit 202, a vehicle orientation estimation unit 203, and an inclination angle management unit 204.

In the image generation unit 201, an image obtained by performing noise removal, distortion correction, rotation processing, and the like on the images captured by the left camera 11, the right camera 12, and the imaging unit 101 is cut out, and an edge image and a grayscale image used in the recognition processing are generated and stored in a generated image holding unit of a memory (not illustrated). Other images are not particularly limited as long as the images are necessary for the recognition processing.

The parallax calculation unit 202 obtains the parallax of the images captured by the two cameras based on the image data obtained by the image generation unit 201 performing noise removal, distortion correction, rotation processing, and the like on the images captured by the left camera 11, the right camera 12, and the imaging unit 101, and converts the parallax into a distance.

The vehicle orientation estimation unit 203 generates a parallax image. A vehicle inclination angle is estimated at a predetermined distance of the road surface on which the vehicle is traveling, based on distance data of the parallax image.

The inclination angle management unit 204 associates the vehicle inclination angle obtained by the vehicle orientation estimation unit 203 with the images captured by the cameras 11 and 12, rotates the captured image using the roll angle of the inclination, and cuts out the captured image using the pitch angle of the inclination. Then, the image generation unit 201 generates an image to be input to the object recognition unit 103 using the corrected captured image.

Figure 3:
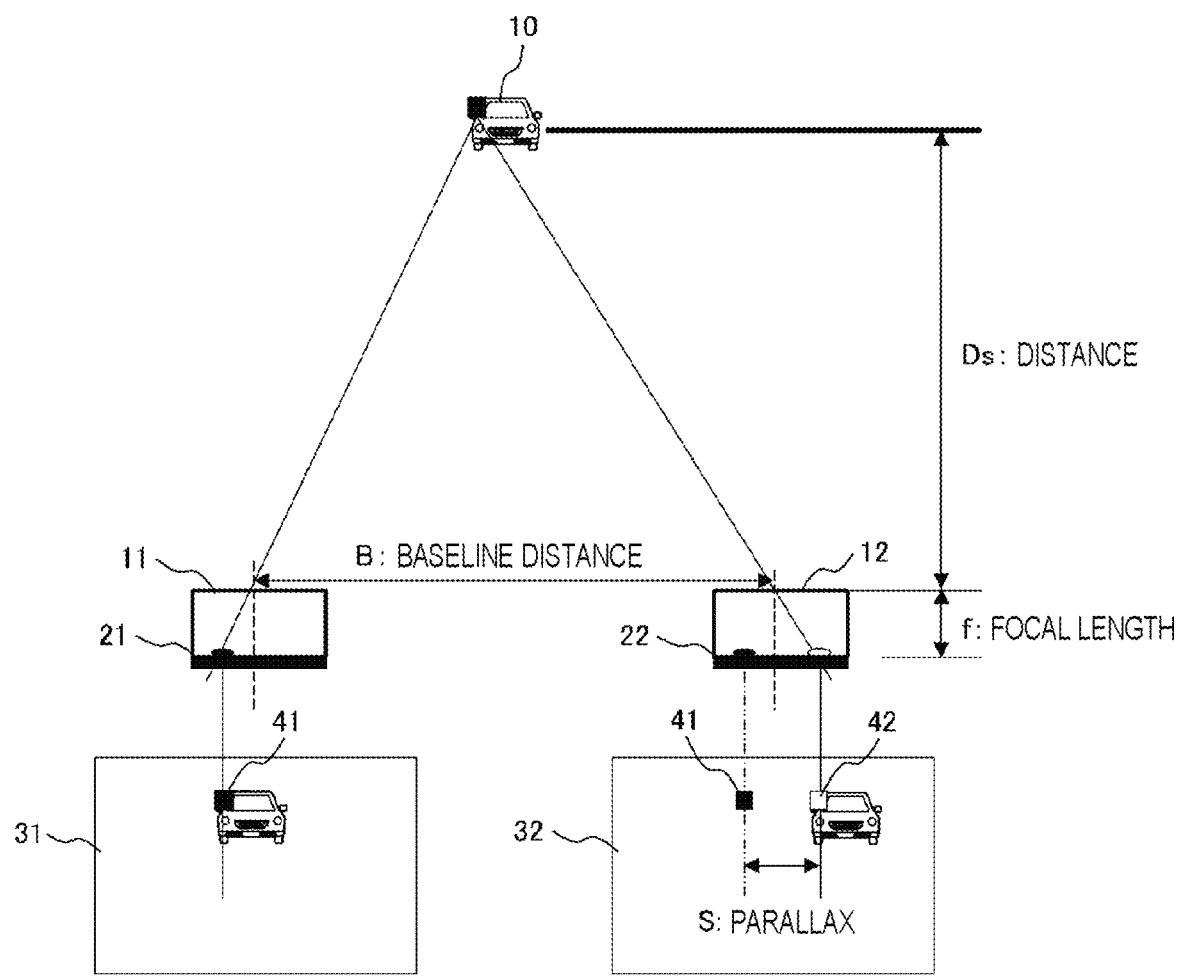
FIG. 3 is a diagram conceptually illustrating parallax calculation processing in a parallax calculation unit of FIG. 2.

FIG. 3 is a diagram conceptually illustrating parallax calculation processing in the parallax calculation unit 202 of FIG. 2. A case where an image of a measurement target object 10 is captured by the left camera 11 and the right camera 12 will be considered. A left image 31 of the measurement target object 10 is captured by a two-dimensional sensor 21 of the left camera 11, and a right image 32 of the measurement target object 10 is captured by a two-dimensional sensor 22 of the right camera 12. The right image 32 captured by the right camera 12 is used as a standard image, and a standard block image 42 of, for example, 5 pixels×5 pixels is defined.

The size of the block image is not limited to this example.

On the other hand, in the left image 31 captured by the left camera 11, a reference image 41 having a search width (for example, 128 pixels) is selected based on the same vertical position (Y coordinate) and horizontal position (X coordinate) as the standard block image 42. Thereafter, the difference between the standard block image 42 and the reference image 41 is calculated. There are several kinds of calculation methods, but in the present embodiment, the following Expression (1) is calculated using the sum of absolute difference (SAD) which is a representative example thereof.

[Expression 1]

$$SAD = \sum_i \sum_j |I(i, j) - T(i, j)| \quad (1)$$

Here, I is an image block (for example, 5×5 pixels) in the reference image 41, T is image data of the standard block image 42, and i and j are coordinates in the image block. In order to calculate one parallax, calculation is performed by the search width while shifting the reference position of the reference image 41 pixel by pixel, and a position at which the SAD value is smallest is searched for.

The left image 31 is captured at the position of the reference image 41. As a result, parallax S occurs between the position of the standard block image 42 and the reference image 41. The parallax S has a large value in a case where a vehicle ahead, which is the measurement target object 10, is close to the left camera 11 and the right camera 12, and has a small value in a case where the vehicle is far from the left camera 11 and the right camera 12. The parallax S obtained in this manner is obtained for the entire image. It is possible to measure the distance to the left camera 11 and the right camera 12 using this parallax S by the principle of triangulation. When a certain object is imaged by cameras of which the optical axes are parallel, the baseline distance is B (m), and focal length is f (pixel), the distance Ds is obtained from the parallax S by the following Expression (2).

[Expression 2]

$$Ds = B \cdot \frac{f}{S} \quad (2)$$

Figure 4:
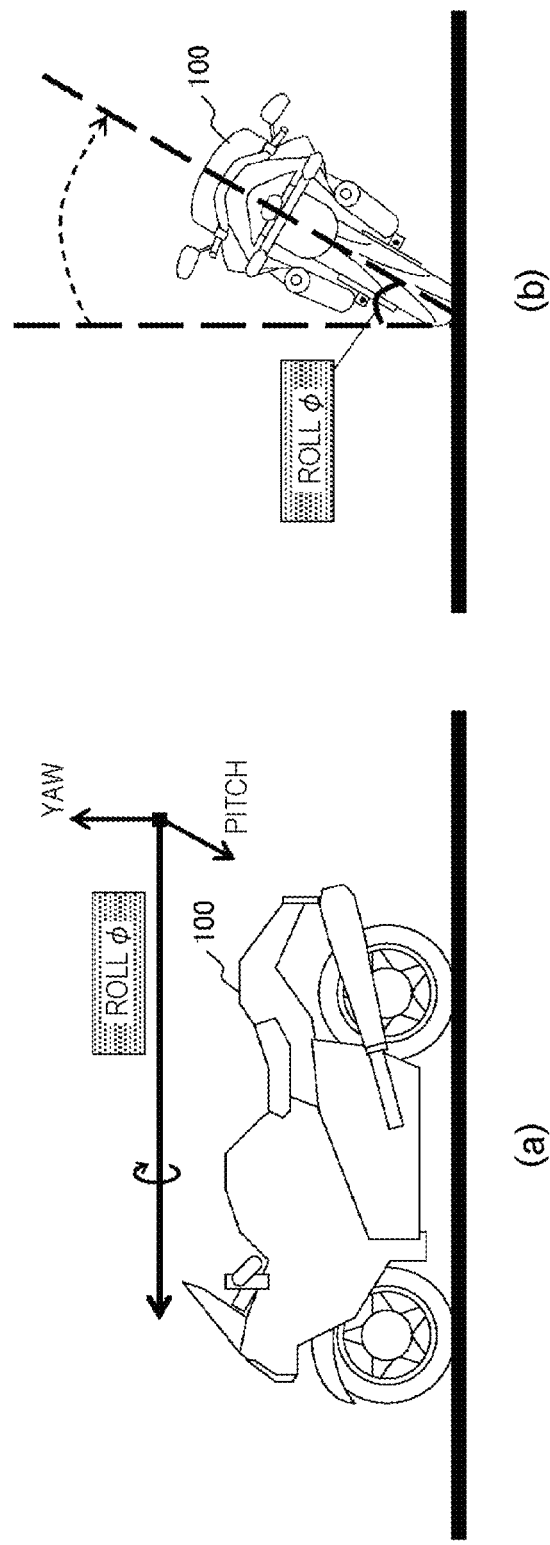
FIG. 4 is a diagram illustrating an inclination angle (roll angle) of a motorcycle according to Embodiment 1 of the present invention.

FIG. 4 is a diagram illustrating a principle of calculating the inclination angle (roll angle φ) of the vehicle 100. In a horizontal state (roll angle φ=0 degrees) of the vehicle 100, a line connecting the center of gravity of the entire vehicle and the center of the tire ground contact surface and the ground form a right angle. The roll angle φ is generated when the vehicle body is inclined. The parallax data of the left camera 11 and the right camera 12 mounted on the vehicle 100 in a roll direction in which the center of gravity is moved to the left and right detects the distance to the front road surface with the rotation in the roll direction, and calculates and outputs the vehicle roll angle (φ) from the detected distance.

Figure 5:
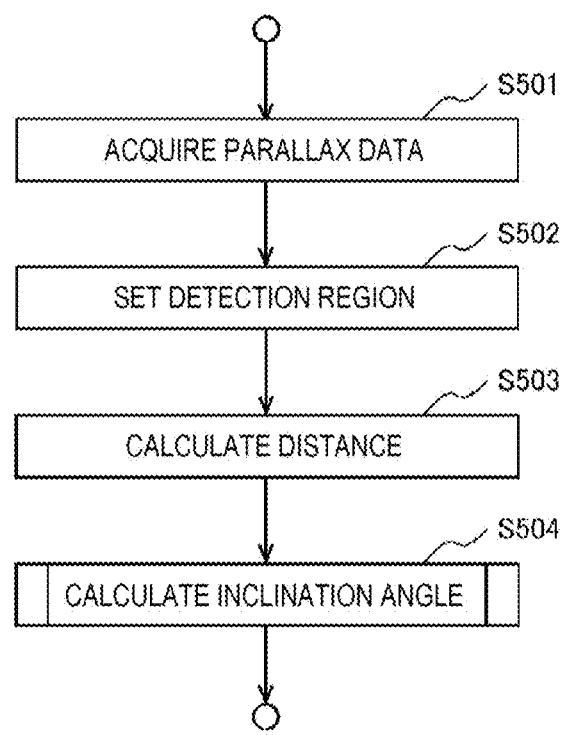
FIG. 5 is a flowchart illustrating processing in a vehicle orientation estimation unit of FIG. 2.
Figure 6:
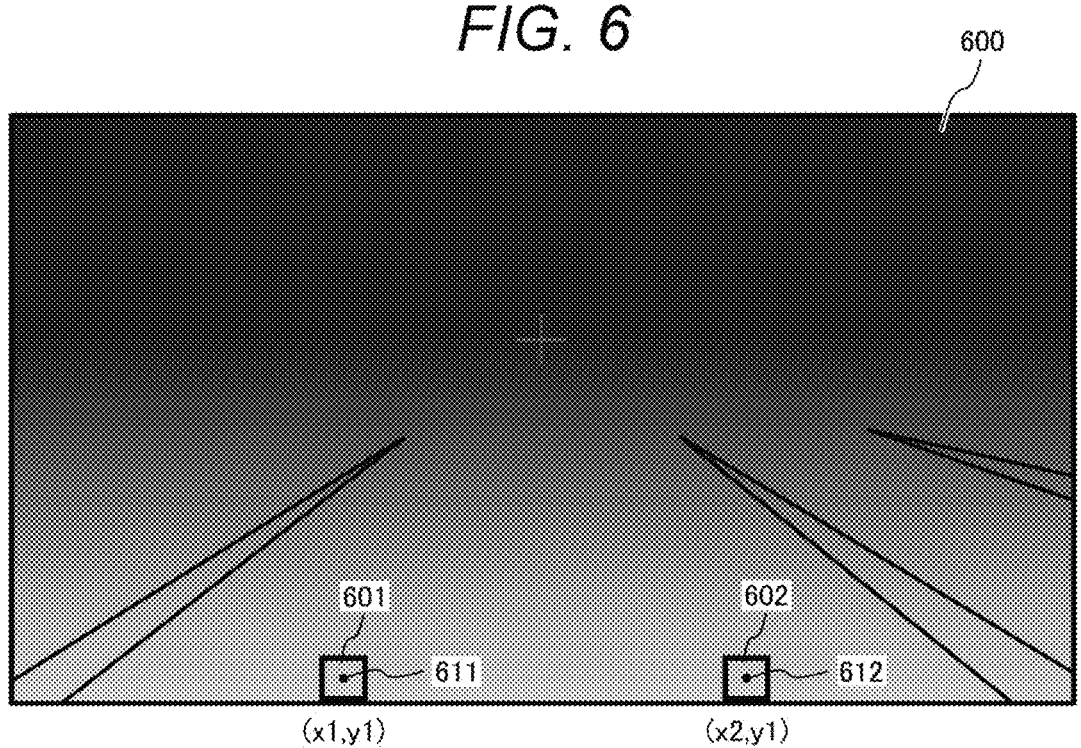
FIG. 6 is a diagram illustrating detection region setting according to Embodiment 1 of the present invention.

FIG. 5 is a flowchart illustrating processing in the vehicle orientation estimation unit 203 of FIG. 2. As illustrated in FIG. 5, first, after the parallax image is acquired in step S501, the detection region is set in step S502, the distance is calculated in step S503 from the region set in step S502, and the inclination angle is estimated using the distance of each detection region in step S504. Hereinafter, each processing will be specifically described with reference to FIG. 6. FIG. 6 illustrates an example of the detection region set in a parallax image 600.

In step S501, the parallax image calculated by the parallax calculation unit 202 of the image processing unit 102 is acquired. An image obtained by visualizing distance information to the measurement target object 10 by color gradation is the parallax image 600 in FIG. 6. In the parallax image, a portion at a short distance is represented in white, and a portion at a long distance is represented in black.

Subsequently, in step S502, the detection region is set in the parallax image 600. In the example of FIG. 6, a first region 601 and a second region 602 provided on the same horizontal line (the same Y coordinate) are installed in a region corresponding to the road surface in a lower region of the parallax image 600. Since the first region 601 and the second region 602 are regions for measuring distances to the road surface, it is desirable to set the first region 601 and the second region 602 to a road surface at a short distance.

In addition, it is necessary to set the vertical and horizontal sizes of the first region 601 and the second region 602 to be the same. In a case where the sizes of the first region 601 and the second region 602 are too small (for example, one pixel), there is a possibility that the accuracy in calculating the distance deteriorates. Therefore, in the present embodiment, the detection region of 9 pixels in height and 9 pixels in width is defined, and center coordinates 611 of the first region 601 are set to (x1, y1), and center coordinates 612 of the second region 602 are set to (x2, y1). The size of the detection region may be appropriately changed without departing from the gist of the present invention.

Subsequently, in step S503, processing of calculating the distance to the road surface shown in each of the first region 601 and the second region 602 is performed. The distance to the road surface is an average value of the distances in respective detection regions. In the present embodiment, in order to consider the noise influence of the parallax data, the parallax data of the detection region is arranged in the order of the closest distance, the average value of the distances is calculated from data obtained by excluding data of the closest distance and data of the farthest distance, and the calculation result is set as a representative distance of the detection region.

As a result, the influence of noise can be eliminated, and the detection distance can be stably obtained. Note that the method of calculating the detection distance is not limited to this, and a distance calculation method in the detection region may be adopted based on the standard deviation or the like.

Subsequently, in step S504, the inclination angle is calculated (estimated) using the distance to the road surface in each of the first region 601 and the second region 602. The processing in step S504 will be described in detail with reference to FIG. 7.

Figure 7:
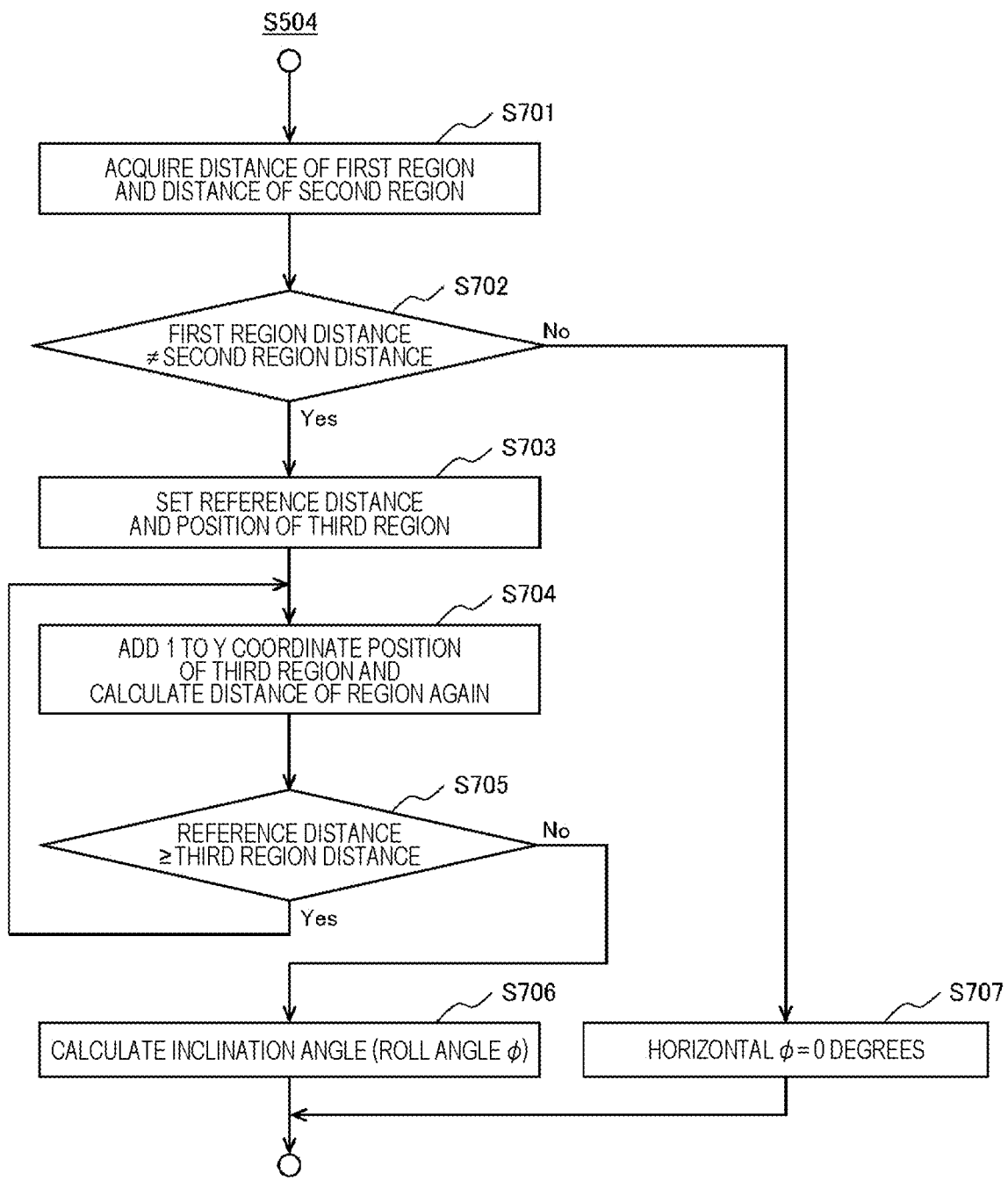
FIG. 7 is a flowchart illustrating inclination angle calculation processing according to Embodiment 1 of the present invention.

FIG. 7 is a flowchart illustrating the details of the inclination angle calculation processing in step S504 of FIG. 5.

First, in step S701, the distances calculated from the first region 601 and the second region 602 is acquired.

Next, in step S702, the acquired first region distance and second region distance are compared, and it is determined whether or not the first region distance and the second region distance have the same value. In a case where both the first region distance and the second region distance have the same value (No), since the vehicle is in the horizontal state with respect to the traveling direction of the vehicle 100, the processing proceeds to step S707, and the roll angle of 0 degrees of the inclination angle is set as the output of step S504.

On the other hand, in a case where both the first region distance and the second region distance are different from each other (Yes), the vehicle is in a state of being inclined to the left or right with respect to the traveling direction of the vehicle 100. For example, in a case where the distance calculated from first region 601 is larger than the distance calculated from the second region 602, the vehicle 100 is in a state of being inclined to the right.

Conversely, in a case where the distance calculated from second region 602 is larger than the distance calculated from the first region 601, the vehicle 100 is in a state of being inclined to the left. In a case where the vehicle 100 is inclined, the processing proceeds to step S703, the larger distance of the detection region is set as a reference value (reference distance), and a third region having the same center coordinates and the same size as the detection region having the small distance is set.

Figure 8:
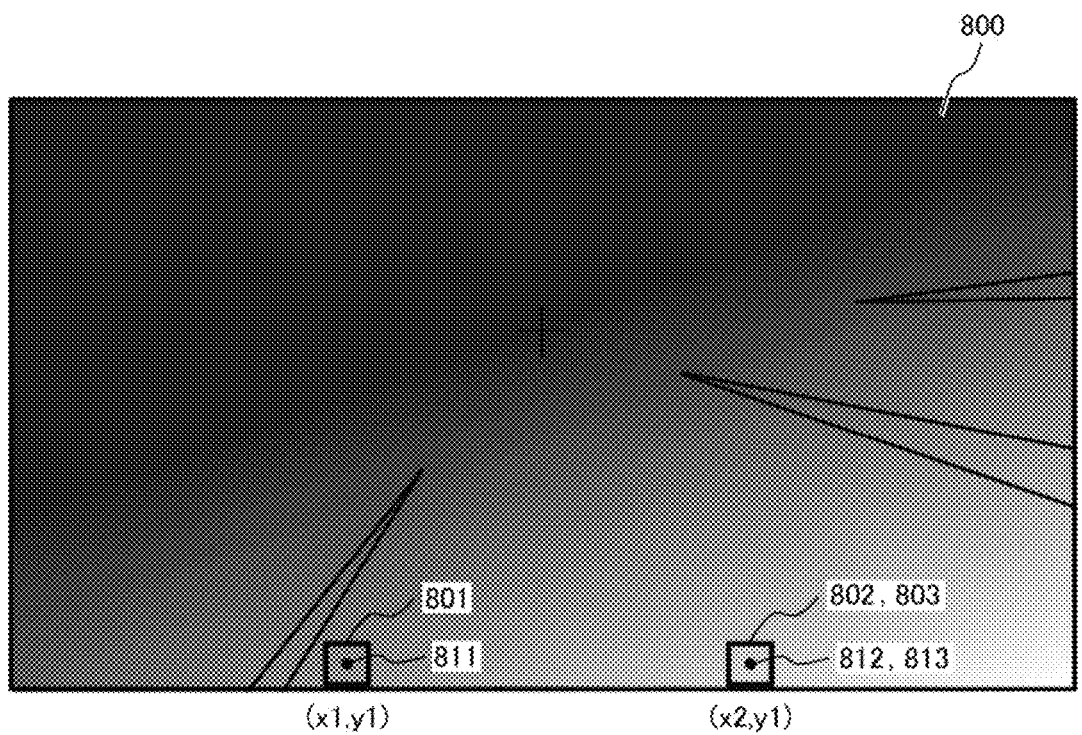
FIG. 8 is a diagram illustrating detection region setting (state of being inclined to the right) according to Embodiment 1 of the present invention.

FIG. 8 illustrates an example in which the detection distance of a first region 801 is larger than the detection distance of a second region 802 in a parallax image 800. The detection distance of the first region 801 is set as the reference value, the vertical and horizontal sizes of a third region 803 are set to be the same as those of the second region 802, and center coordinates 813 of the third region 803 are arranged at the same position (x2, y1) as center coordinates 812 of the second region 802.

Subsequently, in step S704, the position coordinates of the third region 803 are shifted by one pixel in an immediately upward direction of the second region 802, and the distance of the third region 803 is calculated again.

Next, the processing proceeds to step S705, and the reference distance (detection distance of the first region 801) and the distance of the third region 803 are compared. In a case where the distance of the third region 803 is smaller than the reference value (detection distance of the first region 801) (Yes), the processing returns to step S704, and the processing of step S704 is repeated. The size to be shifted in the immediately upward direction may be appropriately changed without departing from the gist of the present invention.

Figure 9:
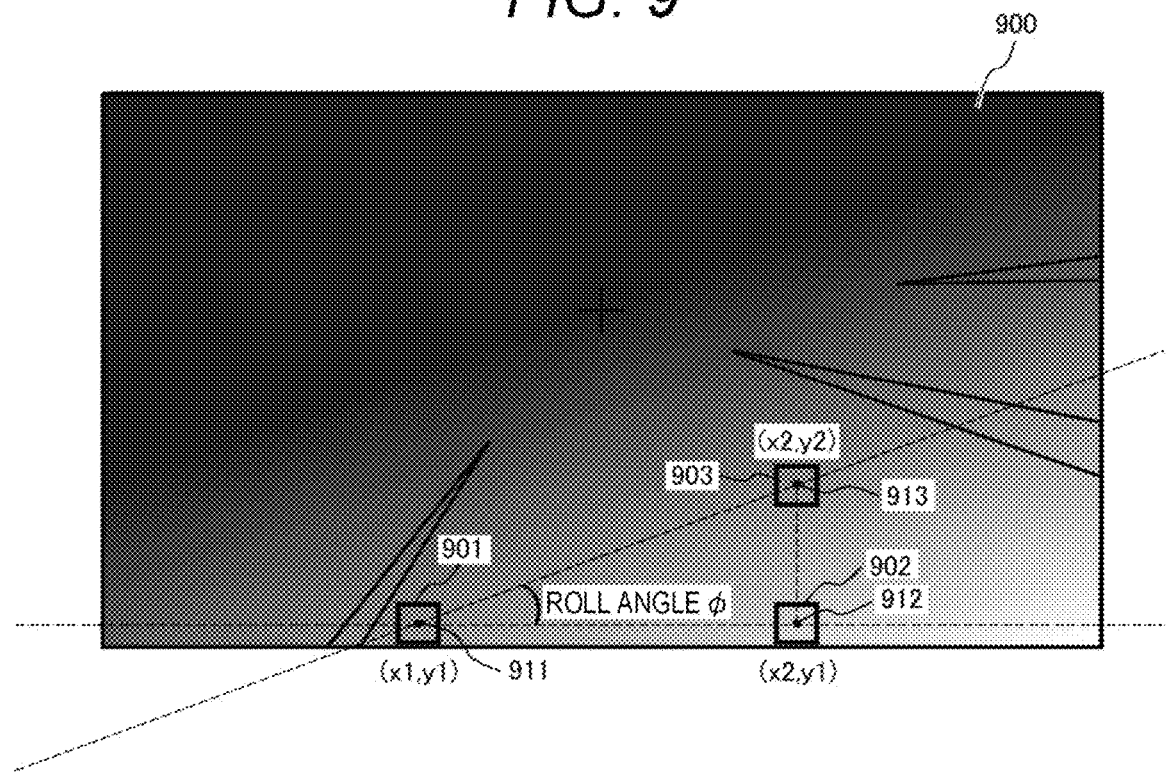
FIG. 9 is a diagram illustrating estimation processing of an inclination angle (roll angle) in FIG. 8.

On the other hand, in a case where the distance of the third region 803 is equal to or larger than the reference value (detection distance of the first region 801) (No), the processing proceeds to step S706, and as illustrated in FIG. 9, the inclination angle (roll angle φ) of the vehicle 100 is calculated from respective center coordinates by the following Expression (3) using center coordinates 911 (x1, y1) of a first region 901, center coordinates 912 (x2, y1) of a second region 902, and center coordinates 913 (x2, y2) of a third region 903 in a parallax image 900.

[Expression 3]

$$\varphi = \tan^{-1}\left(\frac{\Delta y}{\Delta x}\right) \quad (3)$$

Here, $\Delta x = x2 - x1$ and $\Delta y = y2 - y1$.

The information on the inclination angle calculated in step S504 is transferred to each unit.

The inclination angle management unit 204 associates the vehicle inclination angle (roll angle φ) obtained by the vehicle orientation estimation unit 203 with the images captured by the cameras 11 and 12, and rotates the captured image using the roll angle of the inclination.

The image processing unit 102 transfers the vehicle inclination information (roll angle φ) to the object recognition unit 103, and corrects the positions of the world coordinate system for recognition, the camera coordinate system, the image coordinate system, structure from motion (SfM), and the like, thereby performing more accurate recognition.

In addition, the inclination angle of the vehicle 100, the maximum inclination angle with respect to a traveling route, and the maximum vehicle speed are set in advance, and are determined by the vehicle control unit 104 together with the transferred vehicle inclination information (roll angle φ). Processing such as notifying the driver of a dangerous inclination angle and controlling the speed of the vehicle 100 is performed.

According to the vehicle orientation estimation system of the present embodiment described above, since the inclination angle (roll angle φ) of the vehicle can be accurately estimated without the limitation of the traveling environment, correction can be realized based on the appropriate recognition processing. In addition, it is possible to perform processing of rotating the captured image by the image generation unit 201 using the inclination angle.

Note that, in the present embodiment, an example has been described in which the distance to the road surface is measured using the imaging unit 101 that images the front. However, as described above, a configuration may be adopted in which the distance to the road surface is measured using the rear camera installed in the vehicle 100 and the vehicle inclination angle information is generated.

The vehicle orientation estimation system according to the present embodiment includes a region setting unit (step S502 of the vehicle orientation estimation unit 203) that sets the first region 601 and the second region 602 that is on the same horizontal line as the first region 601, in a measurement region (the parallax image 600) corresponding to the road surface acquired by a distance measurement device (the cameras 11 and 12 and the imaging unit 101) mounted on the vehicle 100; a distance calculation unit (step S503 of the vehicle orientation estimation unit 203) that calculates a distance to the road surface of each of the first region 601 and the second region 602 from the vehicle 100; and an inclination angle calculation unit (step S504 of the vehicle orientation estimation unit 203) that obtains the inclination angle (roll angle φ) of the vehicle 100 based on the distance to the road surface of each of the first region 601 and the second region 602 and a positional relationship of the first region 601 and the second region 602.

As illustrated in FIG. 9, the inclination angle calculation unit (step S504 of the vehicle orientation estimation unit 203) searches for a region having the same distance as the first region 901 or the second region 902, as the third region 903 that is not on the same horizontal line as the first region 901 and the second region 902.

In addition, the distance calculation unit (step S503 of the vehicle orientation estimation unit 203) obtains the distance to the road surface from the image (parallax image 900) obtained by the imaging device (the cameras 11 and 12 and the imaging unit 101), and the region setting unit (step S502 of the vehicle orientation estimation unit 203) sets the third region 903 that is not on the same horizontal line as the first region 901 and the second region 902, in the image (parallax image 900).

In addition, the third region 903 is a region having a different distance from the first region 901 and the second region 902.

As described above, without providing a dedicated inclination sensor, it is possible to accurately estimate the inclination angle of the vehicle without being affected by the traveling place or the environment.

Embodiment 2

Next, a vehicle orientation estimation system and a vehicle orientation estimation method according to Embodiment 2 of the present invention will be described with reference to FIGS. 10 to 12. The present embodiment is an example of estimating the pitch angle of the vehicle 100 in the inclination angle processing. Redundant descriptions of points common to Embodiment 1 will be omitted.

Figure 10:
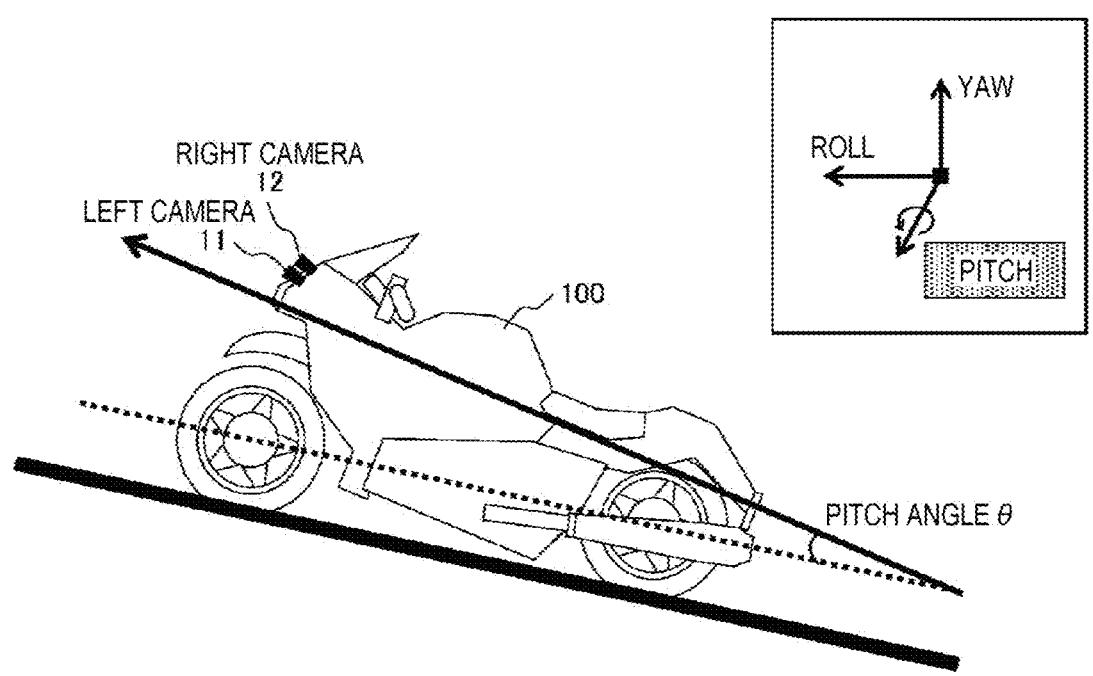
FIG. 10 is a diagram illustrating an inclination angle (pitch angle) of a motorcycle according to Embodiment 2 of the present invention.

FIG. 10 is a diagram illustrating a principle of calculating a vehicle pitch angle. A thick broken line in the drawing indicates a longitudinal axis of the vehicle 100. The longitudinal axis roughly coincides with the traveling direction of the vehicle 100, but does not strictly coincide with the traveling direction since the longitudinal axis is set based on the vehicle body 100. For example, in a case where the vehicle 100 is traveling in a state where the front portion of the vehicle 100 slightly ascends, the traveling direction and the longitudinal axis of the vehicle 100 do not coincide with each other.

The front end side of the longitudinal axis (front portion of the vehicle 100) moves up and down along the direction of gravity to form a pitch angle (θ). Then, parallax data of the left camera 11 and the right camera 12 mounted on the front portion of the vehicle 100 detects the distance to the front road surface with the rotation in a pitch direction, and calculates and outputs the vehicle pitch angle (θ) from the detected distance.

Figure 11:
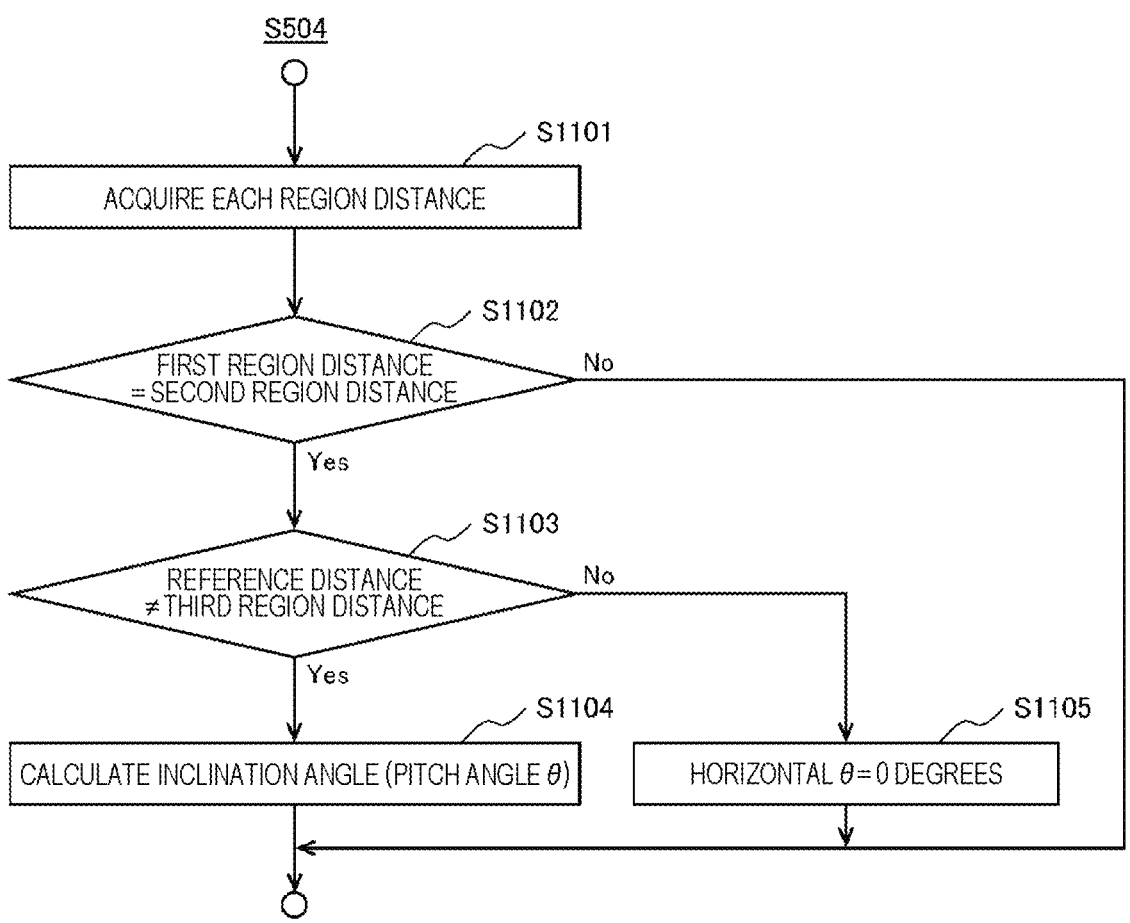
FIG. 11 is a flowchart illustrating inclination angle calculation processing according to Embodiment 2 of the present invention.

FIG. 11 illustrates a flowchart of the inclination angle calculation processing for calculating the vehicle pitch angle (θ) in the present embodiment. In this processing, as illustrated in FIG. 12, a position of a third region 1203 is fixed, and set on the road surface on a second region 1202. Although specific position coordinates are not limited, in a case where the position coordinates are too close to or too far from the second region 1202, there is a possibility that the accuracy in calculation deteriorates. Therefore, it is desirable to set the third region 1203 to the road surface about 1 to 2 m away from the second region 1202.

Figure 12:
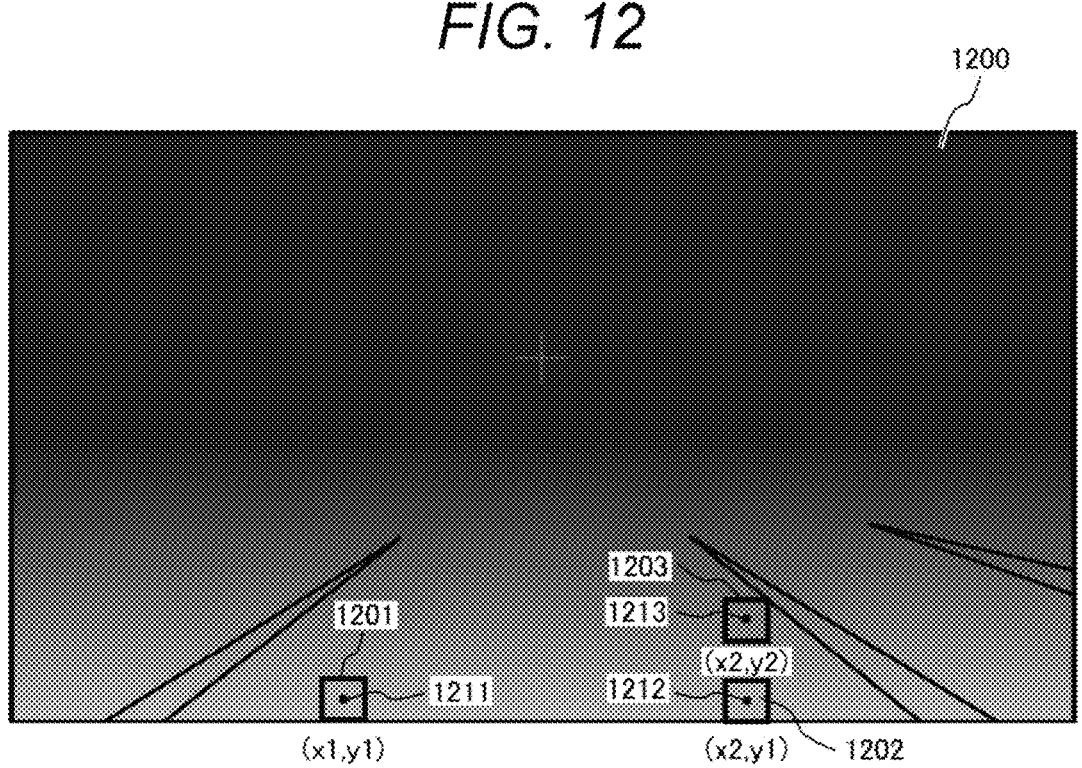
FIG. 12 is a diagram illustrating detection region setting according to Embodiment 2 of the present invention.

For example, in the present embodiment, as illustrated in FIG. 12, in a parallax image 1200, each of a first region 1201, the second region 1202, and the third region 1203 and center coordinates (1211 to 1213) are set, the distances calculated from the first region 1201 and the second region 1202 are the same value, and a measurement value of the third region 1203 in a case where the pitch angle is 0 degrees is set in advance as the reference distance.

In step S1101 of FIG. 11, in the processing of acquiring each region distance, processing of acquiring the distance to the road surface shown in each of the setting regions of the first region 1201, the second region 1202, and the third region 1203 is performed.

Next, in step S1102, the acquired distance of the first region 1201 and the acquired distance of the second region 1202 are compared, and it is determined whether or not the distances have the same value. In a case where the distances are different from each other (No), the pitch angle is read from the result of the previous calculation.

On the other hand, in a case where the distances have the same value (Yes), the processing proceeds to step S1103, and the detection distance of the third region 1203 is compared with the reference distance.

In step S1103, in a case where the detection distance of the third region 1203 and the reference distance have the same value (No), since the vehicle 100 is a horizontal state, the processing proceeds to step S1105, and the pitch angle θ is calculated as 0 degrees.

On the other hand, in a case where the distances are different from each other (Yes), the processing proceeds to step S1104, and the inclination angle (pitch angle θ) is calculated.

For example, it is assumed that a measurement value of the third region 1203 is m3, and a reference distance set in advance from the distance of the third region 1203 is s3. In a case where the distance m3 calculated from the third region 1203 is larger than the reference distance s3 (m3>s3), the vehicle 100 is traveling in a state where the front portion of the vehicle 100 slightly ascends. Conversely, in a case where the distance m3 calculated from the third region 1203 is smaller than the reference distance s3 (m3<s3), the vehicle is in a state where the front portion of the vehicle slightly descends. In a case where the distance m3 of the third region 1203 and the reference distance s3 have the same value (m3=s3), the vehicle travels on a flat road, and a vehicle pitch angle of 0 degrees is output (step S1105).

Therefore, the inclination angle (pitch angle θ) of the vehicle 100 can be calculated by the following Expression (4) using the measurement value m3 of the third region 1203 and the reference distance s3 set in advance from the distance of the third region 1203 (step S1104).

[Expression 4]

$$\theta = \cos^{-1}\left(\frac{\min(m3, s3)}{\max(m3, s3)}\right) \quad (4)$$

The information on the inclination angle calculated in step S504 illustrated in FIG. 11 as described above is transferred to each unit.

The inclination angle management unit 204 associates the vehicle inclination angle (pitch angle θ) obtained by the vehicle orientation estimation unit 203 with the images captured by the cameras 11 and 12, and cuts out the captured image using the pitch angle of the inclination.

The vehicle inclination information (pitch angle θ) is transferred to the object recognition unit 103, the positions of the world coordinate system for recognition, the camera coordinate system, the image coordinate system, structure from motion (SfM), and the like are corrected, and thereby more accurate recognition is performed.

In addition, the inclination angle of the vehicle 100, the maximum inclination angle with respect to a traveling route, and the maximum vehicle speed are set in advance, and are determined by the vehicle control unit 104 together with the transferred vehicle inclination information (pitch angle θ). Processing such as notifying the driver of a dangerous inclination angle and controlling the speed of the vehicle 100 is performed.

According to the vehicle orientation estimation system of the present embodiment described above, since the inclination angle (pitch angle θ) of the vehicle can be accurately estimated without the limitation of the traveling environment, correction can be realized based on the appropriate recognition processing. In addition, it is possible to perform processing of rotating the captured image by the image generation unit 201 using the inclination angle.

Note that, even in the present embodiment, a configuration may be adopted in which the distance to the road surface is measured using the rear camera installed in the vehicle 100 and the vehicle inclination angle information is generated.

Embodiment 3

Next, a vehicle orientation estimation system and a vehicle orientation estimation method according to Embodiment 3 of the present invention will be described with reference to FIGS. 13 and 14. The present embodiment is different from Embodiment 1 and Embodiment 2 in that a curvature radius of a road is used in a case of determining the vehicle inclination angle. Redundant descriptions of points common to Embodiment 1 and Embodiment 2 will be omitted.

Figure 13:
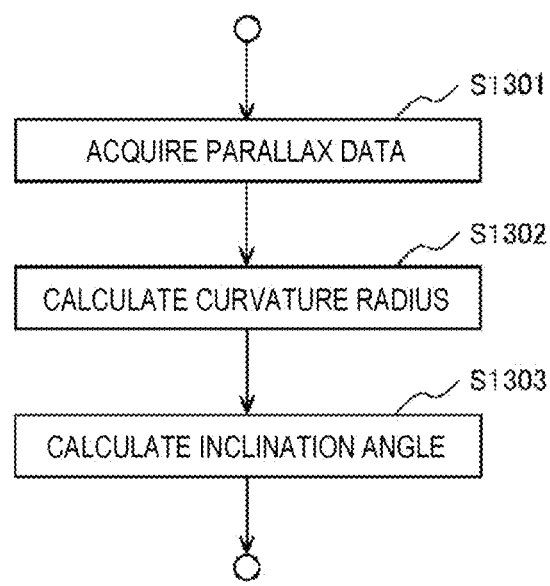
FIG. 13 is a flowchart illustrating inclination angle calculation processing according to Embodiment 3 of the present invention.

FIG. 13 illustrates a flowchart of calculation processing of the vehicle inclination angle in the present embodiment.

First, in step S1301, the parallax data generated by the parallax calculation unit 202 is acquired.

Next, in step S1302, the curvature radius of the road is calculated.

Subsequently, in step S1303, the vehicle inclination angle is obtained from the curvature radius of the road calculated in step S1302 and the own vehicle speed.

Figure 14:
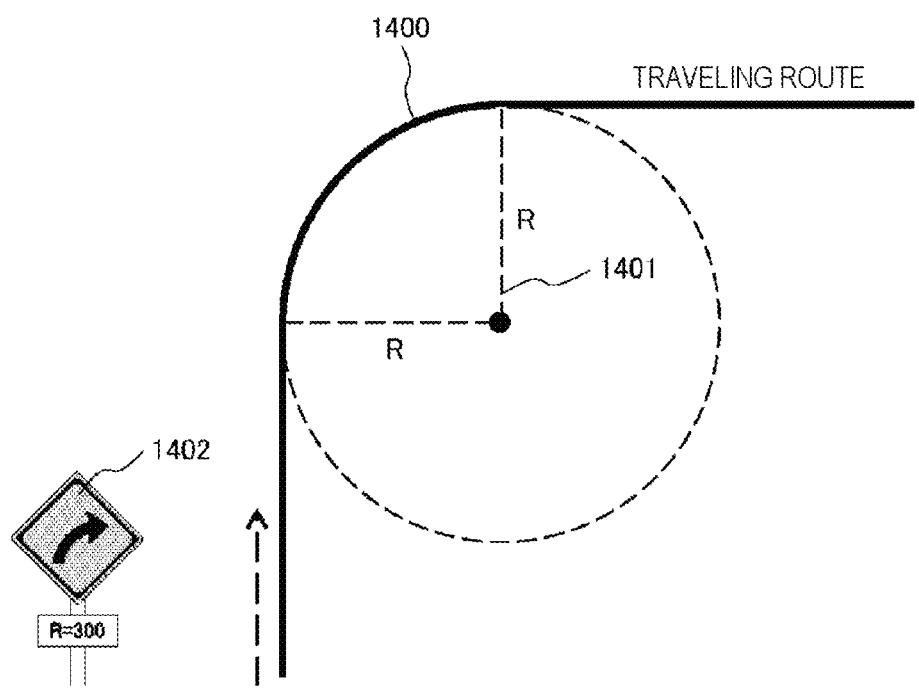
FIG. 14 is a diagram illustrating road shape estimation processing according to Embodiment 3 of the present invention.

As illustrated in FIG. 14, since a traveling route 1400 is a route on which the vehicle has actually traveled, a curve curvature radius 1401 can be obtained based on the parallax data. There is also means for detecting a road sign 1402 by the camera and acquiring the curvature radius from the information displayed on the road sign 1402.

Then, for example, the inclination angle (roll angle φ) of the vehicle can be calculated by the following Expression (5) from the curve curvature radius (R) 1401 calculated from the parallax data, the vehicle speed v, and the gravitational acceleration g.

[Expression 5]

$$\varphi = \tan^{-1}\left(\frac{v^2}{R \cdot g}\right) \quad (5)$$

According to the present embodiment, the inclination angle of the vehicle 100 can be detected from the curvature radius of the road.

Note that the present invention is not limited to the above-described embodiments, and includes various modifications. For example, the above-described embodiments have been described in detail in order to help understanding of the present invention, and are not necessarily limited to those having all the configurations of the description. In addition, it is possible to replace part of the configuration of a certain embodiment with part of the configuration of other embodiments, and further to add the configurations of other embodiments to the configuration of a certain embodiment. In addition, it is possible to add, delete, and replace other configurations for a part of the configuration of each embodiment.

In addition, the difficulty of the infringement finding of the present invention is, from the viewpoint of the parallax image, a method of verifying the difference between the case where the planar image is transferred and the case where the planar image is transferred and the actual image.

In each of the above embodiments, an example of a motorcycle has been mainly described as the vehicle 100, but the present invention is also effective for an off-road four-wheeled vehicle or the like on the premise that the vehicle body is greatly inclined forward, backward, leftward, and rightward.

Furthermore, as described above, the present invention can be applied to an advanced driver assistance system (ADAS) that urges the driver to pay attention to the warning information based on the estimated (calculated) inclination angle by image display using a liquid crystal panel or the like, or sound or warning sound oscillation using a speaker or the like, and can also be applied to autonomous driving (AD) by transferring the warning information based on the estimated (calculated) inclination angle to the alarm notification unit 105 and transferring the warning information to the traveling system control unit 106.

REFERENCE SIGNS LIST

- 10 measurement target object
- 11, 12 camera
- 21, 22 two-dimensional sensor
- 31 left image
- 32 right image
- 41 reference image
- 42 standard block image
- 100 vehicle
- 101 imaging unit
- 102 image processing unit
- 103 object recognition unit
- 104 vehicle control unit
- 105 alarm notification unit
- 106 traveling system control unit
- 201 image generation unit
- 202 parallax calculation unit
- 203 vehicle orientation estimation unit
- 204 inclination angle management unit
- 600, 800, 900, 1200 parallax image
- 601, 602, 801, 802, 803, 901, 902, 903, 1201, 1202, 1203 detection region
- 611, 612, 811, 812, 813, 911, 912, 913, 1211, 1212, 1213 center coordinates (of detection region)
- 1400 traveling route
- 1401 curve curvature radius
- 1402 road sign

The invention claimed is:

1. A vehicle orientation estimation system comprising:
   a region setting unit that sets a first region and a second region that is on a same horizontal line as the first region, in a measurement region corresponding to a road surface acquired by a distance measurement device mounted on a vehicle;
   a distance calculation unit that calculates a distance to the road surface of each of the first region and the second region from the vehicle; and
   an inclination angle calculation unit that obtains an inclination angle of the vehicle based on the distance to the road surface of each of the first region and the second region and a positional relationship of the first region and the second region.

2. The vehicle orientation estimation system according to claim 1, wherein
   the inclination angle calculation unit searches for a region having the same from the vehicle distance as the first region or the second region, as a third region that is not on the same horizontal line.

3. The vehicle orientation estimation system according to claim 1, wherein
   the distance calculation unit obtains a distance to the road surface from an image obtained by an imaging device, and
   the region setting unit sets a third region that is not on the same horizontal line as the first region and the second region, in the image.

4. The vehicle orientation estimation system according to claim 3, wherein
   the third region is a region having a different distance from the vehicle than the first region and the second region.

5. The vehicle orientation estimation system according to claim 1, wherein
   the distance measurement device has a plurality of cameras,
   the distance calculation unit calculates the distances to the road surface from a plurality of images captured by the plurality of cameras, and
   the inclination angle calculation unit obtains the inclination angle of the vehicle based on parallax of the plurality of images captured by the plurality of cameras.

6. The vehicle orientation estimation system according to claim 1, wherein
   the inclination angle calculation unit calculates a curvature radius of a road from the positional relationship of the first region and the second region, and obtains the inclination angle of the vehicle based on the calculated curvature radius of the road, a vehicle speed of the vehicle, and gravitational acceleration.

7. A vehicle orientation estimation method comprising:
   setting a first region and a second region that is on a same horizontal line as the first region, in a measurement region corresponding to a road surface acquired by a distance measurement device mounted on a vehicle;
   calculating a distance to the road surface of each of the first region and the second region from the vehicle; and
   obtaining an inclination angle of the vehicle based on the distance to the road surface of each of the first region and the second region and a positional relationship of the first region and the second region.

8. The vehicle orientation estimation method according to claim 7, wherein
   a region having the same from the vehicle distance as the first region or the second region is searched for as a third region that is not on the same horizontal line.

9. The vehicle orientation estimation method according to claim 7, wherein
   a distance to the road surface from an image obtained by an imaging device is obtained, and
   a third region that is not on the same horizontal line as the first region and the second region is set in the image.

10. The vehicle orientation estimation method according to claim 9, wherein
    the third region is a region having a different distance from the vehicle than the first region and the second region.

11. The vehicle orientation estimation method according to claim 7, wherein
    the distances to the road surface is calculated from a plurality of images captured by a plurality of cameras, and
    the inclination angle of the vehicle is obtained based on parallax of the plurality of images captured by the plurality of cameras.

12. The vehicle orientation estimation method according to claim 7, wherein
    a curvature radius of a road is calculated from the positional relationship of the first region and the second region, and
    the inclination angle of the vehicle is obtained based on the calculated curvature radius of the road, a vehicle speed of the vehicle, and gravitational acceleration.

* * * * *